United States Patent [19]

Henry

[11] 4,121,247
[45] Oct. 17, 1978

[54] POPULATION AND PROFILE DISPLAY OF TRANSPARENT BODIES IN A TRANSPARENT MASS

[75] Inventor: James W. Henry, Kingsport, Tenn.

[73] Assignee: Eastman Kodak Company, Rochester, N.Y.

[21] Appl. No.: 790,792

[22] Filed: Apr. 21, 1977

[51] Int. Cl.² .............................................. H04N 7/18
[52] U.S. Cl. ................................ 358/107; 235/92 PC; 356/129; 358/93;107
[58] Field of Search ......................... 358/93; 356/129; 235/92 PC

[56] References Cited

U.S. PATENT DOCUMENTS

| | | | |
|---|---|---|---|
| 3,767,306 | 10/1973 | Mast | 235/92 PC |
| 3,847,484 | 11/1974 | Gropper | 356/129 |

OTHER PUBLICATIONS

*Soviet Journal of Optical Technology*, vol. 41, No. 9, Sep. 1974, pp. 406–409.

Primary Examiner—Howard W. Britton
Attorney, Agent, or Firm—John F. Stevens; Daniel B. Reece, III

[57] ABSTRACT

Population and profile data of transparent bodies contained within a transparent mass are obtained using a schlieren optical system in combination with a television camera and receiver. The transparent bodies, normally indistinguishable from the transparent mass by the unaided eye, are detected by the schlieren optical system and then magnified and contrasted on the television receiver. The invention is especially useful as a means for quality control in various chemical operations.

12 Claims, 3 Drawing Figures

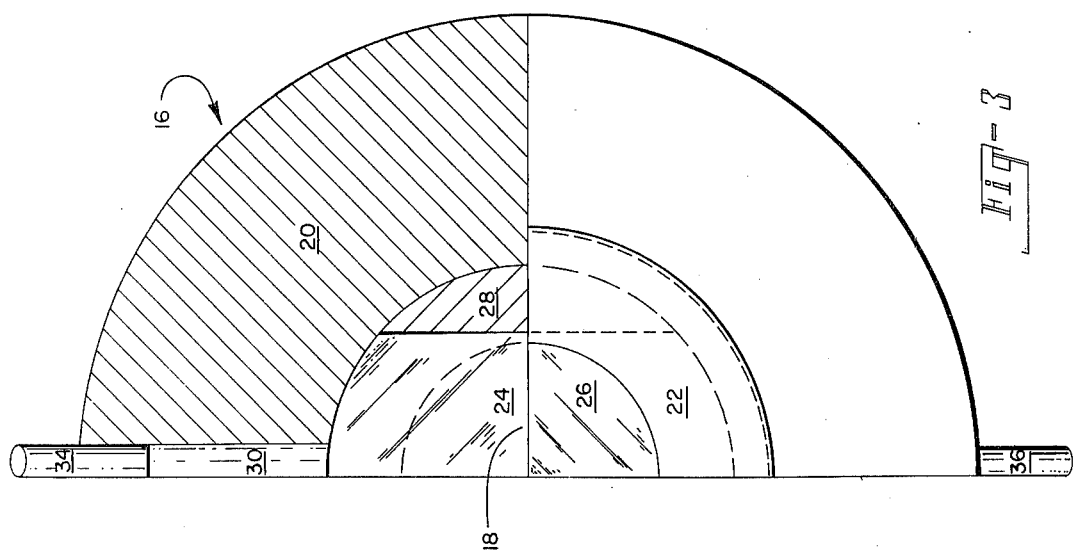
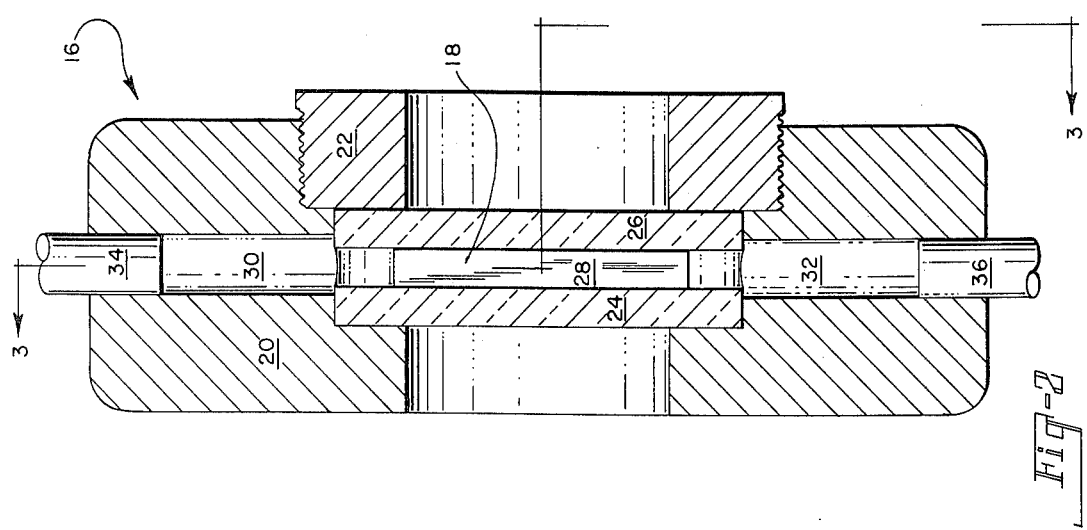

POPULATION AND PROFILE DISPLAY OF TRANSPARENT BODIES IN A TRANSPARENT MASS

This invention relates in general to the use of a schlieren optical system in combination with a television camera and kinescope display device for the examination of specimens containing different refractive indexes. More particularly, this invention relates to the use of such method and apparatus for obtaining population and profile data of transparent bodies contained within a transparent mass.

This invention is particularly useful in quality control techniques in the production of chemicals. For example, transparent polymers often contain transparent particles or bodies which are indistinguishable by the unaided eye. These bodies may be residues from raw materials, foreign bodies, or perhaps malformed portions of the polymer itself. Such bodies are particularly objectionable in solutions or melts of the polymer when spinning or casting operations are undertaken. By examination of such bodies, which normally cannot be seen by the unaided eye using conventional techniques, the population and profile data will allow quality determinations to be made. Also, such data will likely lead to the identity of such bodies so steps can be taken to eliminate them. By use of the population and profile data derived by the present invention, it is possible to determine accurately the quality of a particular specimen, study the causes of poor quality material and possibly eliminate such causes.

In the manufacture of certain products formed from polymers such as cellulose acetate, vinyl chloride, and other polymers which are soluble in organic volatile solvents, difficulty is frequently encountered with portions of the polymer which are not fully soluble in the solvent. These portions tend to swell in some instances, or in other instances they become only partially dissolved, forming gels suspended in the polymer solution. Large portions can be detected and removed by conventional techniques, but the smaller portions tend to interfere with normal manufacturing operations, frequently stopping up holes in extrusion nozzles used to form fibers, or producing hard lumps in the surface of sheeting materials formed from the polymer.

Schlieren optical systems are well known in the art and have been used for observing phenomena involving optical-path differences which result in light beam deflections such as, for example, the checking of mirrors wherein the optical-path differences derive from defects in the mirror, or the analysis of fluid flow in wind tunnels wherein a model is immersed in a gas stream and the optical-path differences derive from the refractive-index variations related to pressure variations. The principle used in observing these phenomena is that the light rays passing through the object being observed are deviated by different amounts depending on the refractive index gradient, which corresponds to the concentration gradient.

Patents relating to schlieren optical systems and/or uses thereof include U.S. Pat. Nos. 3,847,484; 3,617,130; 3,431,352; 3,908,082; 3,030,442; 3,114,797; 3,700,903; and 3,728,006. Also of interest is Krosovskii et al, "The Sensitivity Threshold of an Aulocallination Television Shadow-Graph", Sov. J. Opto Technol., Vol 41, No. 9, September, 1974, p. 406-409 and C. L. Strong, "A Laser Beam and a Photocell are Used to Measure the Dirt Content of Water," The Amateur Scientist. Of particular interest is U.S. Pat. No. 3,847,484 which discloses laser light used in a schlieren system for studying the distribution of molecular density in solution under the influence of a centrifugal force, and the Krasovskii et al article which relates to television shadowgraphs used for studying transparent optical media.

The present invention provides a method of obtaining population and profile data of transparent bodies within a transparent mass which would not be capable of being observed by the unaided eye either because of their size, their transparency, or both. Specimens may be continuously monitored, and with the use of a television camera and kinescope display device, the transparent bodies are magnified and amplified in contrast such that their profile is readily apparent.

It is an object of this invention to render visible to the unaided eye of the viewer a pattern of light and darkness which will accurately depict the shape of transparent bodies within a transparent mass.

Another object of this invention is to provide a method and apparatus for observing, or continuously monitoring, a polymer melt or polymer solution during processing.

A further object of the invention is to convert such patterns into electrical impulses which can be translated into numerical information relating to the size of the bodies, the number of the bodies, and statistical information relating to the population distribution of such bodies.

Other objects will appear hereinafter.

According to this invention, population and profile data of transparent bodies contained within a transparent mass are displayed on a kinescope display device. The transparent bodies are normally not distinguishable from the mass by the unaided eye, but the bodies have different indexes of refraction from the mass. A specimen of the mass containing the bodies is passed into an optical viewing position, wherein a collimated beam of light rays is passed through it to an objective lens and occulting stop to form a schlieren optical system. Rays penetrating the transparent bodies are deviated from the columned beam of light because of a difference in refractive index between the transparent bodies and the transparent mass to form an image of the profile of the bodies within the mass. A sufficient number of the deviated rays to form an image of each body within the viewing area is detected by a television camera and the image is converted into a video signal which is used as the input to a kinescope display device. The kinescope display device amplifies the image of the bodies with respect to contrast and size, to display images of the bodies whereby their relative size and profile may be examined. The light rays which pass through the transparent mass without intercepting the bodies remains columned, and are subsequently condensed and occulted by an obstruction (such as an opaque spot) in its path.

By the term "population and profile data", it is intended to mean the count of bodies for a given area, and their two-dimensional outline.

"Transparent bodies within a transparent mass" refers to a heterogeneous or homogeneous mass, wherein at least one transparent portion of one refractive index is intimately associated with at least one transparent portion of another refractive index. The bodies and the mass may be of the same or different composition. Examples of transparent bodies within a transparent mass include gels contained within solutions of transparent polymer, transparent solids contained within polymer melts, and irregularities in transparent film. It is contemplated that the bodies and the masses may be solids, liquids or gases, or mixtures thereof. Since both the bodies and the masses are transparent, they are indistinguishable by the unaided eye, but they have different refractive indexes due to differences in density, etc.

This invention provides an especially convenient means for monitoring, and thereby obtaining population and profile data from a continuously advancing solution, melt, film, etc. For example, in melt or solution spinning of fibers, or casting of film, a portion of the feed may be bled off and monitored for quality control purposes.

The specimen is normally passed into optical viewing position by holding or passing it, flat against an optical window, or in the case of liquids, through a passage, at least two sides of which are formed by optical windows. By the term "optical windows" it is intended to mean transparent windows which are free of any significant schlieren effect.

The columned beam of parallel light rays may be derived from any convenient source such as a laser beam, a point source, or concentrated filament incandescent lamp. If a laser beam is used, a small-diameter beam may be expanded and recolumnized. Point sources such as a zirconium arc or incandescent lamp may be collimated by conventional optical means.

The schlieren optical system is known in the art. Typically, this optical system includes a source of light which is shielded so that only a small opening emits light. A lens is placed at its focal distance from the opening so that the light is bent into a parallel beam. A second lens collects the parallel beam into an image of the opening and forms an inverted image on the screen or photographic plate. If a knife edge is moved into the light stream near the opening image, the image darkens uniformly.

The schlieren system is based on the fact that the density gradient is also a refractive index gradient. In the schlieren system, light rays passing through the cell are deviated by different amounts depending on the refractive index gradient, which corresponds to the density gradient. The schlieren system translates these deviations into a pattern showing change in refractive index as a function of distance from the axis of rotation.

In such a system, also termed sometimes a "schlieren or strioscopic" apparatus, an image-carrying beam is partially occulted by an opaque surface or knife known as Foucault knife. Such systems are generally used for observing phenomena involving optical-path differences which result in light-beam deflections, such as, for instance; the checking of mirrors, wherein the optical-path differences derive from defects in the mirror; or the analysis of fluid flows, e.g., in wind-tunnel arrangements, in the neighborhood of a mock-up immersed in a gas stream, wherein the optical-path differences derive from the refractive-index variations related to pressure variations.

In the drawings:

FIG. 2 is a side elevational view in section of one form of an optical cell; and FIG. 3 is an elevational view, partly in section, of the optical cell shown in FIG. 2.

Figure 1:
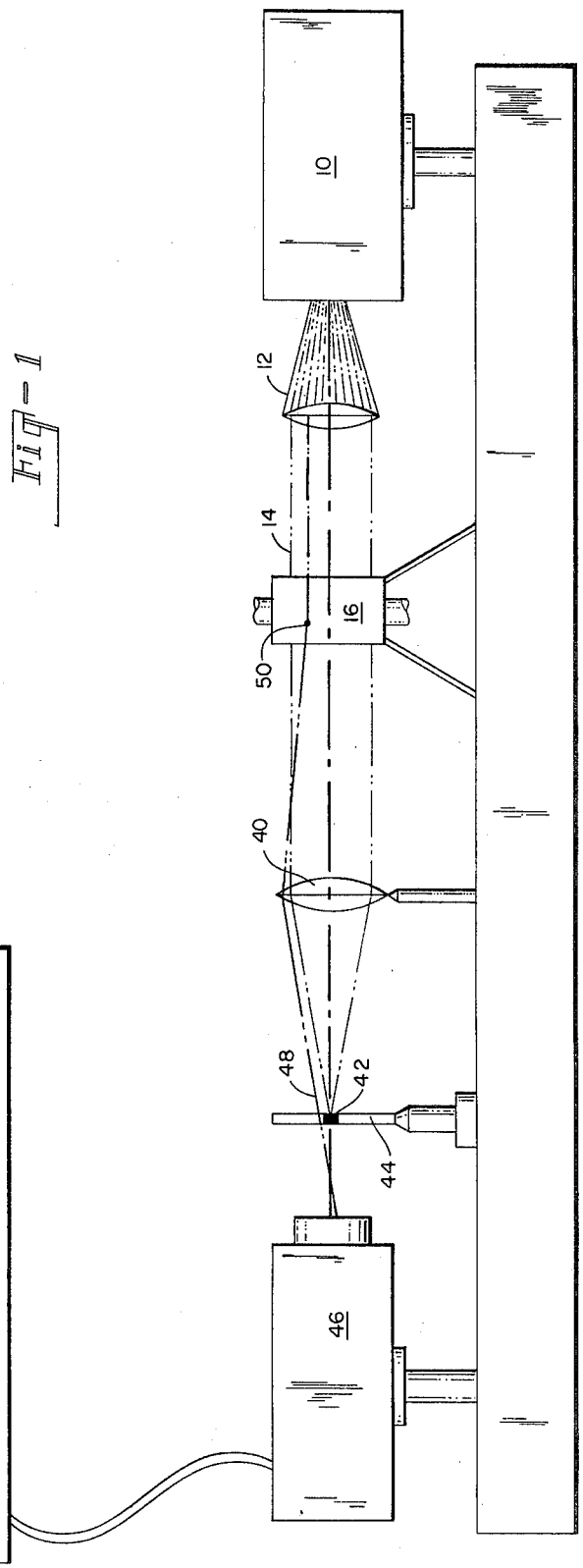
FIG. 1 is a diagrammatic illustration of apparatus used in the method according to this invention.

Referring to the drawings, light source 10 is preferably a laser which includes beam expander section 12, for diverging the light rays of a small column from the laser and recolumnizes the rays into a larger column 14 of parallel light rays. Column 14 is directed through an optical cell 16, shown in greater detail in FIGS. 2 and 3. Cell 16 may contain a stationary or moving specimen. This invention is of particular significance when cell 16 is provided with a passage 18 for the movement of a fluid specimen for continuous examination. Cell 16 is provided with a casing 20 and closure plug 22. The casing contains optical windows 24 and 26 spaced apart by a pair of D-shaped spacers 28 which help define passage 18. Cell 16 has an inlet opening 30 and outlet opening 32 for the feed and discharge of the specimen. Openings 30 and 32 mate with conduits 34 and 36 respectively. The specimen flows in through conduit 34, through opening 30, through passage 18 where it is in position for examination, then through opening 32, and finally exits through conduit 36. Any convenient means may be used to maintain movement of the specimen, such as pressure or gravity.

Light rays passing through cell 16 which are not deviated from the column by bodies of a refractive index different from the mass continue columned to the condensing lens 40. The apex of the condensed cone is occulted by an opaque spot 42 on transparent plate 44. Rays which are deviated from the column and which pass through lens 40, however, are able to avoid the occulting spot 42 and continue through the transparent plate 44 and be detected by the television camera 46, as shown diagrammatically by the line 48.

Television camera 46, by conventional means, amplifies the size and contrast of the image of body 50, and the video signal generated thereby is shown as an image or group of images, which depict the relative size and profile of the body 50 on the kinescope display device 52.

It is preferred that the focal length of lens 40 be relatively large so as to result in a relatively large depth of field in cell 16. Thus, for a depth (thickness of passage 18 as measured parallel to the light rays of FIG. 2) of say a focal length of about 7 to 9 inches is very acceptable. The focal length can be adjusted, of course, by use of different lens 40, using the formula $$1/f = (1/d_1) + (1/d_2)$$

where $d_1$ is the object distance, $d_2$ is the image distance, and $f$ is the focal length. This principal of physics is well known in the art, e.g., Modern College Physics, Third Ed. by Harvey E. White, published by D. Van Nostrand Company, Inc. Thus, bodies over the entire thickness of the specimen should appear in reasonable focus on the kinescope display device.

Since the transparent bodies being displayed will often be of a very minute size, it it preferable to magnify their size electronically through the television camera and kinescope display device in a ratio, for example, of 1 mm = 10 microns.

This invention will be further illustrated by the following example although it will be understood that this example is included merely for purposes of illustration and is not intended to limit the scope of the invention.

EXAMPLE 1

Five samples of cellulose acetate dissolved in acetone are obtained. When these samples are passed through the cell of a viewing device, the following observations are possible on the screen of the kinescope. The unfiltered solution shows large quantities of insolubles such as uncoverted cellulose strands, material believed to be partially acetylated particles, and tri-acetate particles which have not been hydrolyzed to cellulose di-acetate. The second sample is taken after one pass through by this filtration. It is revealed by the apparatus that the cellulose and other insoluble matter in the sample has been removed by the first filtration leaving only partially soluble matter which is able to penetrate the filter material. The second filtration shows a further improvement in removal with large particles and population of particles greatly reduced. The third filtration is shown to have reduced particle count and size even more. The fourth filtration shows increased particle count but no change in size. It was found that the filter had been used to the extent of reintroducing material into the solution.

The invention has been described in detail with particular reference to preferred embodiments thereof, but it will be understood that variations and modifications can be effected within the spirit and scope of the invention.

I claim:

1. Method of displaying population and profile data of transparent bodies contained within a transparent mass wherein said bodies are not distinguishable from said mass by the unaided eye and said bodies and said mass have different indexes of refraction comprising
   (a) moving a specimen of the mass containing said bodies into an optical viewing position wherein said specimen is intercepted by a columned beam of parallel light rays of a schlieren optical system whereby rays penetrating said mass continue in substantially the same columned state and rays penetrating said bodies are deviated from said columned beam of light to form an image of the profile of said bodies within said mass,
   (b) detecting at least a portion of said deviated rays by a television camera, and converting the image into a video signal, and
   (c) using said video signal as the input to a kinescope display device having amplifier means, whereby the image of said bodies is amplified with respect to size and contrast to display said population and profile data.

2. Method according to claim 1 wherein said optical viewing position includes an optical window.

3. Method according to claim 1 wherein said specimen is homogeneous and contains portions of different densities.

4. Method according to claim 1 which includes the steps of providing a passage for said specimen between two closely spaced, substantially parallel optical windows and causing said specimen to continuously move along said passage.

5. Method according to caim 4 wherein said specimen is fluid.

6. Method according to claim 4 wherein said specimen is selected from the group consisting of polymer melts and polymer solutions.

7. Apparatus for displaying population and profile data of transparent bodies contained within a transparent mass, said bodies normally being indistinguishable by the unaided eye, comprising
   (a) means for supporting a specimen for examination such that at least the portion to be examined lies in a predetermined position,
   (b) means for directing a collinated beam of light rays into said specimen whereby rays striking portions of a particular refractive index are maintained in a collinated state and rays striking portions of other refractive indexes are deviated from said collinated beam,
   (c) means for condensing said collinated beam subsequent to passing through said specimen,
   (d) means for occulting said condensed column,
   (e) a television camera positioned to receive at least a portion of the light rays which are deviated from said column, and
   (f) a kinescope display device for receiving a video signal from said camera and displaying an image of said deviated rays.

8. Apparatus according to claim 7 wherein said collinated beam of light rays is a laser beam.

9. Method of displaying population and profile data of transparent bodies contained within a transparent mass wherein said bodies are not distinguishable from said mass by the unaided eye and said bodies and said mass have different indexes of refraction comprising
   (a) providing a passage for a specimen of the mass containing said bodies between two closely spaced, substantially parallel optical windows,
   (b) continuously moving said specimen through said passage wherein said specimen is intercepted by a columned beam of parallel light rays of a schlieren optical system whereby rays penetrating said mass are maintained in a columned state and rays penetrating said bodies are deviated from said columned beam of light to form an image of the profile of said bodies within said mass,
   (c) detecting at least a portion of said deviated rays by a television camera, and converting the image into a video signal, and
   (d) using said video signal as the input to a kinescope display device, whereby the image of said bodies is amplified with respect to size and contrast to display said population and profile data.

10. Method according to claim 9 wherein said specimen is fluid.

11. Method according to claim 9 wherein said specimen is selected from polymer melts and polymer solution.

12. Method of displaying population and profile data of transparent bodies contained within a transparent mass wherein said bodies are not distinguishable from said mass by the unaided eye and said bodies and said mass have different indexes of refraction comprising
   (a) providing a position for a specimen of the mass containing said bodies between two closely spaced, substantially parallel optical windows,
   (b) moving said specimen into said position wherein said specimen is intercepted by a columned beam of parallel light rays of a schlieren optical system whereby rays penetrating said mass are maintained in a columned state and rays penetrating said bodies are deviated from said columned beam of light to form an image of the profile of said bodies within said mass,
   (c) detecting at least a portion of said deviated rays by a television camera, and converting the image into a video signal, and
   (d) using said video signal as the input to a kinescope display device, whereby the image of said bodies is amplified with respect to size and contrast to display said population and profile data.

* * * * *